Patented July 11, 1950

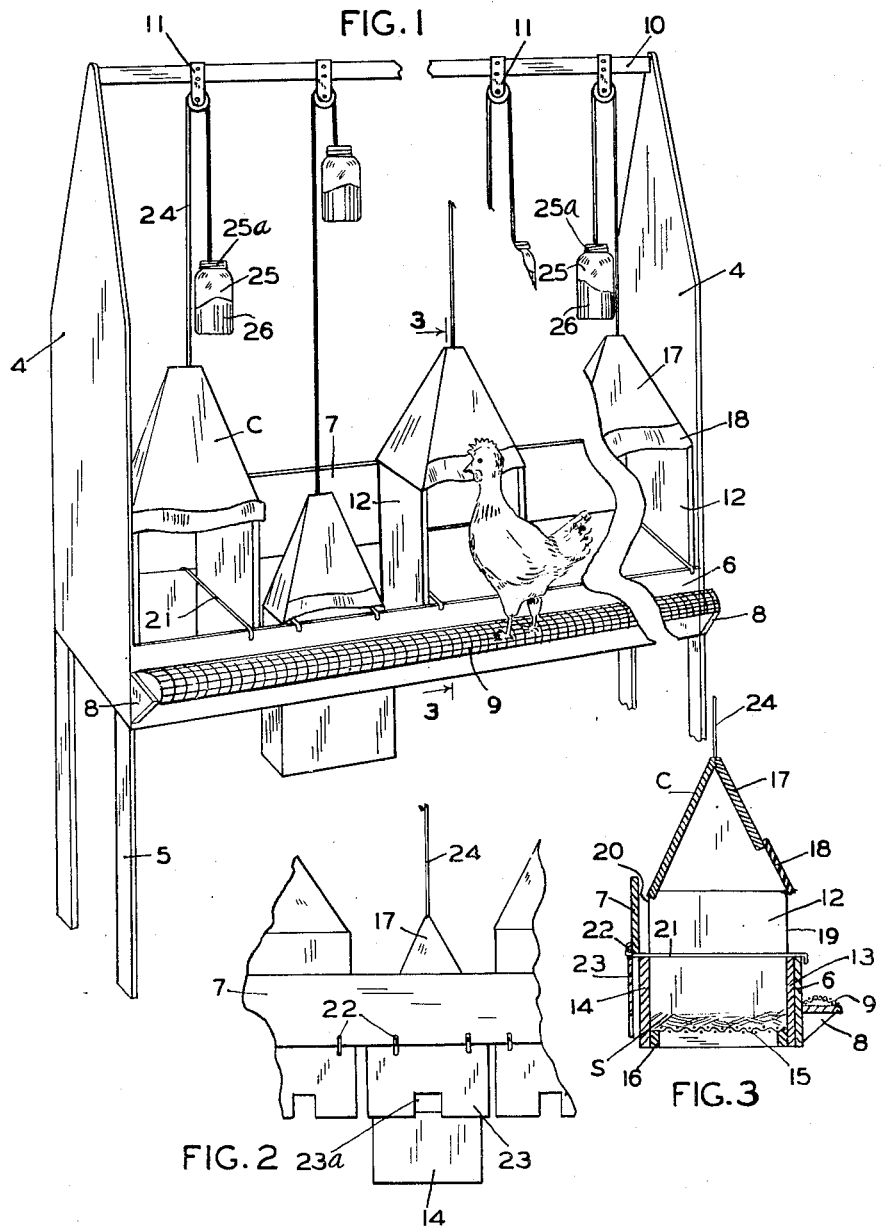
INVENTOR
HAROLD M. STANCHFIELD
BY Williamson & Williamson
ATTORNEYS

2,515,063

UNITED STATES PATENT OFFICE 2,515,063

POULTRY NEST

Harold M. Stanchfield, Foreston, Minn.

Application September 3, 1946, Serial No. 694,469

1 Claim. (Cl. 119—49)

This invention relates to poultry nests.

With the ordinary poultry nest, considerable difficulty is encountered for several reasons. The ordinary poultry nest is fixedly supported, and as a result it often occurs that several hens will crowd into the nest at the same time, this often resulting in the breakage of eggs already laid in the nest as well as preventing the best laying conditions. Also with the fixed nest, chickens will often go into the nest when not desiring to lay, causing soilage and breakage of eggs already found in the nest.

It is an object of the present invention to provide a novel and improved poultry nest of cheap and simple construction which will permit of but one fowl occupying the nest at a time, thereby eliminating breakage and soilage of eggs.

Another object of the invention is to provide a novel and improved poultry nest including a nesting compartment which is movable from a raised position, permitting a fowl to enter the nest, to a lowered position where the nesting compartment is pretty well screened from the light, the compartment being movable from the raised to the lowered position by the weight of the fowl upon entering the nest.

A further object is to provide such an elevator type of nest so constructed that the fowl cannot be injured as the compartment moves from raised to lowered position.

Another object is to provide such a nest which can be successively used by different hens to permit a number of eggs to be laid in the nest and can be so controlled that, after a certain number of eggs have been laid, the nest can no longer be used until the eggs are removed, whereby breakage of eggs is prevented by reason of the deposit of too many eggs in the nest.

The objects and advantages of the invention will more fully appear from the following description made in connection with the accompanying drawings wherein like reference characters refer to the same or similar parts throughout the various views and in which:

Fig. 1 is a perspective view showing a battery of nests of the present invention arranged as they may be in a henhouse, certain of the nesting compartments being in raised position and one of the nesting compartments being occupied by a hen and being in lowered position.

Fig. 2 is a view in rear elevation showing portions of the structure illustrated in Fig. 1; and Fig. 3 is a vertical sectional view taken through a vertical plane in which the line 3—3 shown in Fig. 1 may fall.

While the device can be worked out to provide any number of nesting compartments, in the drawings there is illustrated a battery nest including a number of nesting compartments. In accordance with the illustrated form of the invention there are provided a pair of side frames 4 supported as by legs 5 and interconnected by a horizontal front bar 6 and a horizontal rear bar 7. The two bars 6 and 7 are disposed in spaced parallel relation, and the rear bar 7 is disposed above the front bar 6, preferably in such relationship that the lower edge of the rear bar 7 lies in approximately the same horizontal plane as the upper edge of the front bar 6. The front bar 6 preferably carries a pair of perch supporting brackets 8, which project forwardly therefrom, and these brackets carry a round wire mesh perch 9 on which the fowls may light preparatory to entering the nesting compartments. The perch 9 is preferably made of wire mesh so as to permit droppings from the fowl to fall therethrough and also to permit dirt carried by the feet of the fowls to be pretty much worked off of the feet of the fowls before they enter the nesting compartments. The two side frames 4 are also preferably interconnected near their upper ends by an overhead bar 10, which carries a plurality of sheaves 11.

Working between the two bars 6 and 7 and movable upwardly and downwardly in respect thereto are a plurality of nesting compartments designated as entireties by the letter C. Each nesting compartment C includes a pair of spaced side walls 12, a lower front wall 13, a lower rear wall 14, a screen wire bottom 15 supported as on cleats 16 attached to the walls 12, 13, and 14, and a steeply pitched roof 17. The front wall of the roof 17 terminates at its lower edge short of the lower edge of the rear wall of the roof and the front edge of the roof is equipped with a rubber guard section 18, which projects below the lower edge of the front roof section for a purpose presently to appear. The compartment C is not closed in between the front and rear edges of the roof 17 and the front and rear sections 13 and 14, and accordingly each compartment forms what may be called a front entrance opening 19 and a rear exit opening 20, these two openings being horizontally aligned in the structure illustrated.

Combination guide and stop members 21 are connected at their ends to the lower edges of the rear bar 7 and the upper edges of the front bar 6, and these guide and stop members extend transversely across the compartments C through the front and rear openings 19 and 20 thereof.

Two stop members 21 for each compartment C are preferably provided, and these members preferably lie adjacent the sides 12 of the compartments so as to act as guides during up and down movement of the compartments. They will also act as stops limiting both the upward and downward movement of the compartments, the upward movement of the compartment being limited by the stop members 21 to a position where the front opening 19 is located above the front bar 6 while the rear opening 20 is closed by the rear bar 7, and down movement of the compartment being limited to such a position that the front bar 6 closes the front opening 19 while the rear opening 20 is located below the level of the rear bar 7.

Swingably attached, as by small straps 22, to the lower edge of the rear bar 7 is an apron 23 for each compartment, this apron being located in such a position that it will overlie the rear opening 20 for the compartment in connection with which it is used when the compartment is in lowered condition. Each apron 23 is preferably provided with a small notch 23a through which the hen or fowl may pass its head so as to permit the fowl to readily raise the apron for egress from the compartment C when the compartment is in lowered condition. Also the notch 23a permits a small amount of light to enter the compartment when it is in lowered condition so that the hen will naturally seek to get out of the compartment through the rear opening 20 when the hen is ready to leave the nest.

A line 24 is attached to the peak of the roof of each compartment C, and each line runs over one of the sheaves 11 and its free end is attached as to a counterbalancing weight 25. It is desirable in some instances to vary the weight of the counterbalancing weights 25, and for this purpose each counterbalancing weight 25 may be made in the form of a Mason jar having a screw cap 25a attached to a line 24, and each Mason jar may be filled to a desired level, as by sand 26, so as to properly counterbalance the weight of the compartment C as desired.

Each nesting compartment C will be partially filled with straw S or other suitable nesting material. The weight 25 will be heavy enough to hold the compartment C in raised condition with the front opening 19 exposed and the rear opening 20 closed by the rear bar 7. A hen wishing to lay will jump or flutter up to the perch 9, and finding one of the compartments C in raised condition, the hen will enter the compartment through the front opening 19. The weight of the hen will then be sufficient to overbalance the weight 25, and accordingly the compartment C which the hen has entered will drop from the raised position illustrated in the drawings to the lowered position there shown. As this occurs, most of the light to the nesting compartment will be cut off so that the hen can lay its egg in comparative darkness, which is found to be desirable. In other words, the laying hen will naturally seek a darkened place to lay its egg in preference to a light place. The hen, having laid its egg without being disturbed by other hens, will, after laying, seek the light, and accordingly it will place its head through the notch 23a in the apron 23 closing off the outlet opening 20, and by raising its head and pushing on its body, the hen will swing the apron 23 out of the way of the opening 20 and emerge from the compartment C. The weight 25 will then raise the compartment C back to the elevated position, whereupon the nest is in condition for receiving another laying hen.

It is found that often several chickens will attempt to crowd into the same nest, or if one hen is laying, another hen will crowd into the nest with the laying hen, thereby disturbing the laying hen and possibly breaking or dirtying any egg that has been laid in the nest. This is impossible with my nest. As soon as a single fowl enters the laying compartment C, the compartment lowers, closing off the front opening 19 and making it impossible for more than one hen or fowl to enter the nest. To prevent injury of the head of the chicken as the compartment lowers from the elevated to the lowered position, the guard section 18 is provided so that the head of the chicken cannot be caught between the lower edge of the front of the roof 17 and the front bar 6. The compartment 12 is preferably provided with a screened bottom 15 so as to allow dust and fine particles of straw which may accumulate in the nest to drop through the bottom of the nest, thereby keeping the nest in clean and sanitary condition at all times. The roof 17 is sharply pitched to prevent the fowls from roosting thereon.

By varying the quantity of sand 26 disposed within one of the Mason jar weights 25, the compartment can be counterbalanced as desired. Thus, for example, the weight can be varied so that after a certain number of eggs have been laid in the nesting compartment, the weight of the accumulated eggs plus the compartment C will overbalance the weight 25 and retain the nest in lowered condition when the last laying fowl leaves it. The nest will then remain out of service until the accumulated eggs have been removed, and it will be impossible for a hen to enter the nesting compartment which might cause breakage or dirtying of one or more of a number of accumulated eggs in the nest.

The device has been successfully demonstrated in actual practice. It is found in chicken houses equipped with the present type nests and also the ordinary stationary type nest that the chickens will prefer the present nest to the old type. They readily accustom themselves to the movement of the nest from the elevated to the lowered position and do not seem to be frightened due to this movement.

Of course, as previously stated, the nest can be made up to have any number of nesting compartments from one up.

It will of course be readily understood that various changes may be made in the form, details, arrangements, and proportions of the various parts without departing from the scope of the present invention, which, generally stated, consists in the matter shown and described and set forth in the appended claim.

What is claimed is:

A poultry nest comprising a suitable supporting structure including a front bar and a rear bar, said two bars being disposed in spaced parallel relation with the front bar at a lower level than the rear bar, a nesting compartment disposed between said two bars for upward and downward movement relative thereto, said compartment having aligned front and rear openings, combination guide and stop members extending through the openings of said compartment between the lower edge of said rear bar and the upper edge of said front bar and limiting the upward and downward movement of said compartment while guiding the same, an overhead support, means carried by said support and urging said compartment to an upper position and adapted to be overbalanced by the weight of a fowl entering the compartment so that the weight of the fowl will carry the compartment to a lowered position.

HAROLD M. STANCHFIELD.

REFERENCES CITED

The following references are of record in the file of this patent:

UNITED STATES PATENTS

| Number | Name | Date |
|---|---|---|
| 87,173 | Jarvis | Feb. 23, 1869 |
| 879,132 | Hannes | Feb. 11, 1908 |
| 917,174 | Smith | Apr. 6, 1909 |
| 985,333 | Elston | Feb. 28, 1911 |
| 1,071,201 | Blevans | Aug. 26, 1913 |
| 1,430,457 | McLagan | Sept. 26, 1922 |
| 1,628,366 | Kummeth | May 10, 1927 |
| 1,639,020 | Baar | Aug. 16, 1927 |
| 1,925,456 | Muehr | Sept. 5, 1933 |
| 2,106,878 | Sinclair | Feb. 1, 1938 |
| 2,200,901 | Smith | May 14, 1940 |

FOREIGN PATENTS

| Number | Country | Date |
|---|---|---|
| 9,641 | Great Britain | A. D. 1891 |